(12) United States Patent
Moeinifar et al.

(10) Patent No.: US 9,246,957 B2
(45) Date of Patent: Jan. 26, 2016

(54) SYSTEMS AND METHODS FOR INTERACTIVE CONTENT GENERATION

(75) Inventors: Shahram Moeinifar, Oakville (CA); Ali Ghafour, Ajax (CA)

(73) Assignee: VIAFOURA, Toronto (CA)

( * ) Notice: Subject to any disclaimer, the term of this patent is extended or adjusted under 35 U.S.C. 154(b) by 176 days.

(21) Appl. No.: 13/410,927

(22) Filed: Mar. 2, 2012

(65) Prior Publication Data

US 2013/0232203 A1  Sep. 5, 2013

Related U.S. Application Data

(60) Provisional application No. 61/449,412, filed on Mar. 4, 2011.

(51) Int. Cl.
*G06F 15/16* (2006.01)
*H04L 29/06* (2006.01)
*H04L 29/08* (2006.01)

(52) U.S. Cl.
CPC .......... *H04L 65/403* (2013.01); *H04L 65/4046* (2013.01); *H04L 65/4084* (2013.01); *H04L 67/02* (2013.01)

(58) Field of Classification Search
USPC .................................. 709/204–207; 715/753
See application file for complete search history.

(56) References Cited

U.S. PATENT DOCUMENTS

| | | | |
|---|---|---|---|
| 2007/0198534 A1* | 8/2007 | Hon et al. ........................ | 707/10 |
| 2008/0183829 A1* | 7/2008 | Smilowitz et al. ............ | 709/206 |
| 2008/0184122 A1* | 7/2008 | Grant et al. .................... | 715/723 |
| 2008/0263585 A1* | 10/2008 | Gell et al. ......................... | 725/32 |
| 2009/0049041 A1* | 2/2009 | Tareen et al. ...................... | 707/5 |
| 2009/0063995 A1* | 3/2009 | Baron et al. .................. | 715/753 |
| 2009/0271524 A1* | 10/2009 | Davi et al. ..................... | 709/231 |
| 2009/0292738 A1* | 11/2009 | Hurwitz ......................... | 707/200 |
| 2010/0185733 A1* | 7/2010 | Hon et al. ...................... | 709/205 |
| 2010/0205541 A1* | 8/2010 | Rapaport et al. .............. | 715/753 |
| 2011/0202537 A1* | 8/2011 | Shamma et al. .............. | 707/741 |
| 2011/0239130 A1* | 9/2011 | Lindley ......................... | 715/751 |
| 2012/0053936 A1* | 3/2012 | Marvit .......................... | 704/235 |
| 2012/0123811 A1* | 5/2012 | Socolof ............................ | 705/5 |

(Continued)

FOREIGN PATENT DOCUMENTS

EP  2367146 A1 *  9/2011

OTHER PUBLICATIONS

Meagan Palatino,Social Sharing—Publish Your Videos to Facebook, Twitter & YouTube,Sep. 25, 2011, www.longtailvideo.com/blog/22445/social-sharing-publish-y our-v ideos-to-f acebook-twitter-y outube/, 9 Pages.*

*Primary Examiner* — Jeffery Williams
*Assistant Examiner* — Christopher C Harris
(74) *Attorney, Agent, or Firm* — Fish & Tsang, LLP

(57) ABSTRACT

A web content generation platform is provided that is operable to initiate and guide the creation of interactive web content, including video debate content, and publish the content dynamically to one or more pages. The platform also includes an analytics engine that is operable to establish information regarding user preferences and interests based on their creation of interactive content or related content, consumption of interactive content or related content, and/or engagement with one another based on such interactive content or related content. A novel workflow for guiding the creation of video debate content is also provided, which is embodied in the content engine of the web content generation platform.

12 Claims, 8 Drawing Sheets

(56) References Cited

U.S. PATENT DOCUMENTS

| | | | |
|---|---|---|---|
| 2012/0179755 A1* | 7/2012 | Fishkin et al. | 709/204 |
| 2012/0215773 A1* | 8/2012 | Si et al. | 707/723 |
| 2012/0323991 A1* | 12/2012 | Wang et al. | 709/203 |
| 2013/0042186 A1* | 2/2013 | Tranchina | 715/753 |

* cited by examiner sitmoes# SYSTEMS AND METHODS FOR INTERACTIVE CONTENT GENERATION This application claims priority to U.S. provisional application 61/449,412 Mar. 4, 2011.

FIELD OF THE INVENTION

The present invention relates generally to web platforms that enable feedback. More particularly this invention relates audience engagement platforms.

BACKGROUND OF THE INVENTION

Numerous platforms are known for enabling engagement with the audience for content. Computer network implemented audience engagement platforms exist for example for embedding interactive features such as social media features into web content such as a website. Audience engagement platforms for example link to a website, or embed into a website, feedback applications, review applications, commenting tools, blogging tools, reviewing tools, polling applications, galleries, contest functionality, tools enabling communications between users (such as discussion threads, billboards, or messaging applications), and so on ("audience engagement platform features").

In order to create a rich multimedia experience, websites are increasingly expected to incorporate sophisticated interactive functionality. Such functionality enhances user engagement, which can be leveraged to define interest of the users, for example, for the purpose of creating new content or to target advertising to users.

There is a need for new interactive content, and methods for managing the creation of such content that are easy to use and bring to completion. There is a need for integration of such interactive content into web properties in a seamless way, and for providing access to useful analytics related to consumption of such interactive content.

The present invention has been developed with a view to the foregoing considerations.

SUMMARY OF THE INVENTION

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

In one embodiment of the present invention, there is provided a computer implemented system for generating interactive digital content comprising: at least one server computer or group of interconnected computers defining a cloud network, linked to one or more applications, so as to define a content engine wherein the content engine is operable to: (a) guide two or more users participating in the creation of interactive digital content that includes contributions by two or more users, including by operation of an associated communication facility that is operable to initiate communications with The two or more users; (b) receive contributions of the two or more users to the interactive digital content, track the progress of the provision of the contributions based on one or more workflows for creating interactive digital content embodied in the content engine; and (c) once the contributions are received, assembling these contributions to form interactive digital content, and dynamically publishing the video debate content to one or more web pages.

In another embodiment of the present invention, there is provided a computer implemented system for generating interactive digital content comprising: at least one server computer or group of interconnected computers defining a cloud network, linked to one or more applications, so as to define an audience engagement utility, implemented as a server application or as an Internet service; the audience engagement utility is linked one or more websites that incorporate interactive functionality, or the audience engagement utility provides interactive functionality to one or more websites, and such interaction functionality enables users to engage with content, including a web page, a content item, information, a topic, or a digital media object (including an article, e-book, video, television episode, music file) by providing comments, feedback, or posts (in any medium), and the audience engagement utility is linked to the one or more websites so as to: enable one or more users engaging with content to initiate a content engine part of or linked to the audience engagement utility to initiate one or more communications, based on a workflow embodied, in the content engine to make two or more video contributions relevant to the content, and the content engine assembles the video contributions so as to generate interactive digital content that is published at the one or more websites, or a one or more portions relevant to the content.

In yet another embodiment of the present invention, there is provided a computer implemented method for generating interactive digital content comprising: (a) providing one or more web pages incorporating one or more interactive functions that enable one or more users to engage with content, including a web page, a content item, information, a topic, or a digital media object (including an article, e-book, video, television episode, music file) by providing comments, feedback, or posts (in any medium); (b) embedding into the one or more web pages a link to a content engine in a way that is readily accessible in connection with the one or more users engaging with the content, such that the one or more users are able to link to the content engine to initiate the creation of interactive digital content that involves contributions by two or more selected users; (c) guiding the two or more selected users to making their contributions, and upon the contributions being made, generating the interactive digital content based on their contributions; (d) publishing the interactive digital content including in connection with the one or more web pages from which the content engine was originally accessed, thereby publishing to the one or more web pages new, interactive content that enhances the interest of users to engage with the one or more web pages.

Figure 1:
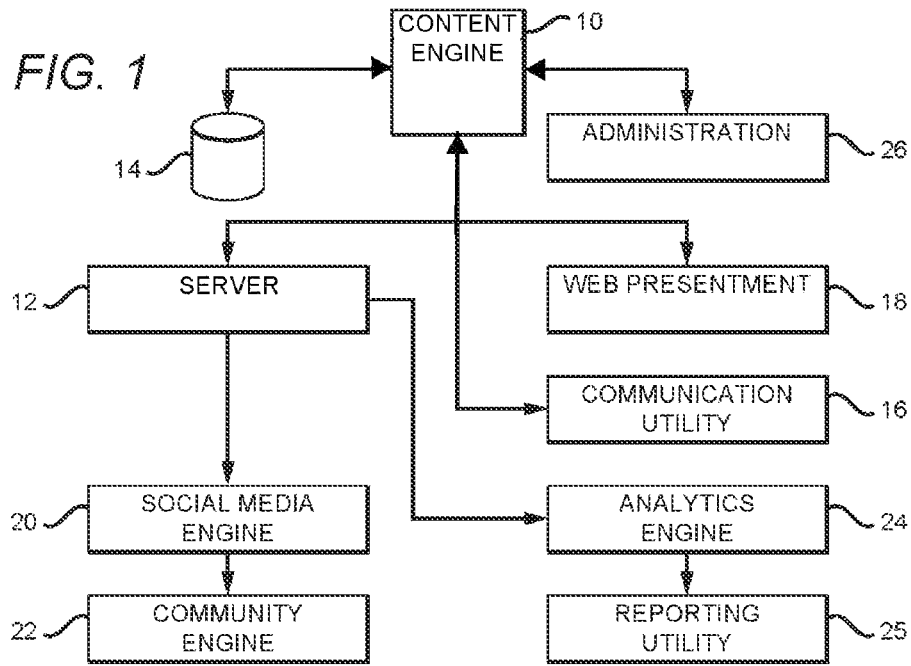
FIG. 1 illustrates a schematic diagram depicting one embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

An audience engagement platform that is operable to plug into one or more existing websites (whether multiple web properties associated with an entity, or different web properties associated with different entities) so as to increase the level of interaction between users participating in inter-user engagement through the website(s). More particularly, the audience engagement platform, in addition to conventional audience engagement platform features, includes a web content generation platform, and more particularly a web content generation platform that is operative to interactive video content in an efficient and user friendly manner.

More specifically, the web content generation platform is operable to manage the creation of interactive digital content, where at least one user engages in a method for creating video debate content. Video debate content is highly engaging for the participants, and also for others consuming the website content. It has been shown that the audience of a website finds interactive digital content, and in particular interactive video such as video debate content, to be highly engaging.

In one insight of the present invention, is linking the creation of interactive digital content with a platform or a service that (i) manages the contributions of users to the creation of interactive digital content, linked to a web page, topic or content item, and based on or more workflow designed to ensure the completion of the contributions, (ii) tracks the consumption of the interactive digital content, including interactions between users, and the interactive digital content, and also interactions between users in connection with the interactive digital content, and (iii) based on (ii) generates user engagement insights or analytics that relates to the web page, topic or content item, for consumption that relates by a platform customer or service customer.

A further insight of the present invention is that creation of interactive digital content, such as video debate content, is of personal interest to the contributor/participant, and this content and/or participation in its creation is something that contributor/participants are motivated in sharing through social networks, and also "friends" in social networks are interesting in consuming such content. By linking the relevant web pages to social media networks, and enabling others through the social media networks to consume the content and link back to the web pages, the potential reach of the web pages can be increased significantly.

One aspect of the invention is the conception that an audience engagement platform that incorporates or links to video debate functionality provides an audience engagement platform with improved engagement characteristics. Another aspect is the invention of a particular integration of interactive video functionality into an audience engagement platform, as further described below.

The generation of interactive video content, between two or more users who are associated with different network connected devices who are in remote locations, in a way that is efficient and that ensures completion of the creation of the interactive video content in an acceptable proportion of instances, is not trivial. This requires a workflow that is designed to enable the creation of highly engaging interactive video content, made by users with short attention spans and many activities and a lot of content competing for their attention.

One aspect of the invention is the innovative workflow that is used to initiate in a plurality of steps the creation of various aspects of the interactive video content of the present invention, and enabling the assembly of the interactions between the platform and the participating users to form the interactive video content, or video debate content of the present invention. One aspect of the invention is the workflow and related technology used in enabling the creation of interactive video content.

In one aspect of the present invention, the content generation platform enables users to interact not only through text but also audio, video and split screen video debate in relation to the website content and/or with other users (possibly on selected topics that may or may not be related to the website content). This heightened level of interaction results in greater user engagement, revenues and deeper analytics concerning user behavior. In other words, another contribution of the inventors is the integration of the video debate content in an audience engagement platform, where the platform links the video debate content with one or more topics, and the audience engagement platform is operable to link with the presentation of the interactive video content with one or more audience engagement platform features that enable other users to interact with the topics and/or interactive video content, for example by posting comments regarding the content, or the particular positions taken by the user participating in the interactive video content.

One aspect of the present invention entails a new form of interactive content, namely a split screen video debate, where the users "play" the content and thereby initiate a video stream that incorporates video content from two or more users, assembled using the technology of the invention, to provide an integrated interactive video debate.

Another aspect of the present invention is a specific workflow for guiding the two or more users to provide specific information, and then video comment on the information.

The workflow is important because the creation of the interactive video content depends on being able to guide the two or more users through the steps involved in a way that they are cumulatively likely to complete the steps required. The steps involved in the workflow provide positive completion ratios, and also content that possesses a degree of interactivity and other factors such as length, that make the content attractive to a large number of users, which thereby creates further interest in the engagement and also related content (if any) which in turn improves the value that users perceive in participating in the website(s) in question, or consuming the relevant associated content, or creating the user engagement desired for example by a content promoter.

An important aspect of the platform of the present invention, and also of the interactive video content generation workflow embodied in the platform, is that the audience engagement platform of the present invention is configured so that users can readily access the functionality specifically at the time where their interest in participation is at a peak. In order to elicit the participation in the generation of this type of valuable content, there is often a narrow window of opportunity within which the users are likely to participate, and then in terms of their participation there is a limited attention span that must be addressed, otherwise the users will lose interest and the opportunity to engage them will have been lost. The audience engagement platform and the workflow embodied in the platform is configured in order to improve the likelihood that the users will initiate the creation of the interactive video content, and also that the two or more users will conclude their participation.

In one related aspect of the invention, the interactive video content generation utility is configured so that it is integrated with a commenting functionality of one or more websites or other form of digital media content, and/or the communication functionality of the one or more websites or other digital media content. In this way, if one or more users are interested in discussion of a particular topic or specific content, then they can initiate the creation of interactive video content. In another aspect of the invention, it is anticipated that various techniques for tracking interest in particular web pages, topics, or content items may be used, including at a user profile level, in order to detect when a particular user is likely to be interested in contributing to the creation of interactive digital content.

In one aspect of the invention, the platform enables a user to "challenge" a user, for example a user associated with a particular posting or comment linked to the audience engagement platform to participate in a web implemented video debate. It should be understood that this is an important insight of the inventors, namely enabling a plurality of users to engage with content (such as a topic, or digital media object such as an article, video, television episode, music file etc.), and consume output from such user engagement such as feedback, comments, posts (regardless of the media used), and based on such user engagement enable one or more users to dynamically challenge one or more users within the group of users engaging with the content, within the web environment created or linked to the platform, to an interactive video debate. This enables users to react to for example a posting from somebody with an opposing view that they would like to challenge, the interaction with whom would yield a lively, engaging video debate.

In another aspect of the invention, once the interactive video content has been generated, the content may be linked to the specific web content that led to the creation of the interactive video content, for example a particular comment to which a user responded by initiating one or more other users (including optionally the author of the comment). For example, the platform of the present invention may be operable to automatically embed into one or more web pages a link to the interactive video content, such that the link is readily associated with the comment by users viewing the one or more web pages.

This seamless integration of the interactive video content generation with the various audience engagement platform features such as commenting features or other community aspects of one or more websites, by operation of the platform, provides an important improvement to the interactivity websites generally.

In another aspect of the invention, the audience engagement platform initiates the creation of interactive content, integrated with various interactive features of the platform for example the commenting or other community aspects, where the interactive content is based on interaction around a topic or content based on text, audio, video, and/or split screen video debate (or any combination of the foregoing).

In a further aspect of the invention, a system is provided that provides an intelligent collaborative content infrastructure that enables one or more users to access content that is created based on engagement of two or more users regarding a topic or content.

It should be understood that the content created or assembled by operation of the present invention is generally multimedia content. Content described may include any manner of digital content, whether audio, video, graphical content or text, in any structure, format or medium. The content may include or incorporate for example e-books, articles, selections of e-books or articles, compilations of works, dynamically generated document summaries, data feeds such as RSS or TWITTER™, feeds, blogs or blog portions, web excerpts, search results, and so on.

In another aspect of the invention the platform includes or is linked to an analytics utility that is operable to analyze either continuously or based on predetermined engagement related milestones, how a topic or content item, at a particular point in time is being received by the relevant users. The output of application of such analytics yields data that enables the content providers or advertisers to develop understandings regarding the topics, contents, or engagement regarding topics or contents that is of interest to users.

Implementation

In one aspect, the present invention may be implemented as a computer program. Server application software and databases may execute on both centralized computers and distributed, decentralized systems. The Internet or any other private or public network (for example a company's intranet) may be used as the network to communicate between the centralized servers and the various computing devices and distributed systems that interact with it In one aspect of the computer program, the user interface may be provided to a user via a web server that is operable to deliver web pages. In particular the computer program includes a web presentment utility that is operable to generate a series of web pages that incorporate content generated by operation of the present invention.

As depicted in FIG. 1, the platform of the present invention may be implemented as or may include a content engine (10) that produces the content based on user engagement as described herein. The content engine (10) is in network communication with a server (12) (or a server farm or cloud network) and is configured to receive, analyze and route content to a database (14) linked to the server. The content engine (10) embodies one or more workflow for creating content including interactive content, based on a series of interactions with users. The content engine (10) is linked to a communication utility (16), which is operable to create a series of communications with one or more users participating in a content creation workflow defined by the content engine (10). The communications are operable to initiate the users, based on the sequence of steps defined by the particular workflow, to provide as input a contribution to the content, whether as text, audio, video or otherwise, which may be received as communications to or uploads to the communication utility (16).

In this way, the content used to assemble the interactive content, such as video debate content, is assembled by operation of the server (12) (which may be the cloud). This is significant because the work required for example to perform any transcoding, assembly of content, conversion of content into multiple format for ease of consumption from a variety of network-connected devices (not shown) associated with users, whether desktop computers, tablet computers, or especially a mobile device, can be handled by operation of the server (12), enabling users to consume content on demand, including the interactive content enabled by operation of the platform.

The content engine (10) is interoperable with the database (14) to define a database structure such as a file for storing a series of content components related to particular content, such as an interactive video debate and any related content, based on the applicable workflow. The content engine (10) is further interoperable with the communication utility (16) and/or database (14) to monitor the progress of the workflow. The content engine (10) may be responsive to the current state of the progress of the workflow to initiate a series of steps such as the sending of reminders to one or more users to provide for example the next required input to the content, based on the workflow. Consequently, the content engine (10) is operable to manage or guide one or more users in the steps required to create content by operation of the present invention. In other words, the invention includes a series of rules related to the workflow, the rules being designed and configured on the platform to enable the completion of the workflow, thereby providing the desired interactive content.

It should be understood that users may also provide links to related content or upload documents related to the content created by operation of the content engine (10).

The communication utility (16) server is capable of receiving content in multiple messaging formats.

The platform further includes a web presentment utility (18) that is best understood as a WMS that is operable to provide content as web objects that may be inserted into web pages for publication by a third party web server, or that automatically updates web pages and publishes these by operation of a web server part of or linked to server (12).

It should be understood that the operations of the content engine (10) may be associated with a social media engine (20) or web community engine (22) in order to associate interactive content of content engine (10) with engagement between users through the social media engine (20) or web community engine (22).

For example the web community engine (22) may consists of one or more utilities that enable engagement between users, such as a bulletin board or comment utility commonly associated with a number of web sites.

Once the content has been generated, the content may be linked by operation of the audience engagement platform or systems linked to the platform for example to the specific web content that led to the creation of the content (e.g. a particular comment to which a user responded by initiating one or more other users such as optionally the author of the comment). In order to achieve this functionality, the platform of the present invention is operable to automatically embed into one or more web pages a link to the content (e.g. interactive video content), such that the link is readily associated with the comment by users viewing the one or more web pages.

Optionally, the platform of the present invention can include or be linked to an analytics engine (24) that is operable to analyze how a topic or content item, at a particular point in time is being received by the relevant users. The analytics engine (24) is operable either continuously or based on predetermined engagement related milestones. Data outputted by the analytics engine enables content providers or advertisers to develop understandings regarding the topics, contents, or engagement regarding topics or contents that is of interest to users, and also the degree of interests based on well known metrics. The analytics engine (24) may be configured to log interactions between users regarding a topic or content item, including the specific type of interaction and the degree of engagement associated therewith. In one aspect, interactions may be ranked by the system based on degree of engagement. For example, participation in a video debate on a topic may be associated with a higher ranking, and selection of a web object that records a summary of a user's position regarding a topic, content item, or position expressed in an electronic debate (e.g. selection of a "THUMBS UP" or "THUMBS DOWN" icon) may have a lower ranking.

The audience engagement platform of the present invention is operable to create and manage a profile for users, including their degree of engagement with topics or content items, and then to aggregate this information across users, so as to yield timely and valuable information such as trending of topics or content items with which users are willing to engage in a significant way. In another aspect of the invention, the audience engagement platform may incorporate a series of "engagement profiles" that enable the categorization and reporting on interest of users with topics or content items based on willingness to engage therewith.

The analytics engine (24) may be linked to a reporting utility (25) that is operable to generate, based on output from the analytics engine (24) a variety of reports or feeds relating for example to user preferences or level of engagement in regards to specific topics or content. The analytics engine (24) may be operable to analyze engagement between users including the content created by operation of the content engine to then determine trends regarding user interest and engagement, and optionally generate reports or feeds based on this output. These reports may be consumed for example by content providers, customers of the operator of the platform, or sponsors of content. The feeds may be used for example automatically in connection with the operation of an ad server in regards to placement of ads in the web pages, including new web pages created dynamically by the web presentment utility (18) based on the content created by operation of the content engine (10).

In another aspect of the invention, the platform is configured to utilize the profiles described in connection with a matching engine, which may rely on information from the analytics engine (24), which incorporates one or more techniques for identifying two or more users who are likely to want to participate in a debate of a particular topic, or content item, and also that this debate is likely to be engaging for users. The output of the matching engine may be that, based on a series of parameters, Bob and Sally are likely interested in debating topic A at this time. In one further aspect of the invention, audience engagement platform is operable to automatically invite Bob and Sally to debate a particular topic. In addition, the audience engagement engine is operable to invite other users to consume the digital debate content. For example, the platform may define a group of users who are likely interested in this content and send this group of users a message that in substance says "Platform has invited Bob and Sally to discuss topic A. Click here to make them do it!". This allows users to engage with the content in advance and urge Bob and Sally on. Responses from users are logged by the platform and may be displayed on a web page dynamically create to receive the eventual debate content. Messages may be sent to Bob and Sally indicating interest in the debate. Bob and Sally engage in the debate, and the users who have indicated an interest are notified, as well as the debate is published through related channels. The audience engagement platform provides the means for skilled debaters who are passionate around particular topics, including popular pairings of debaters, to engage periodically to create interactive content and become repeat debaters through the platform. This way the platform contains the mechanisms to create and leverage rivalries through an accessible web platform that produces significant interest, engagement, following, and traction.

It should be understood that the present invention is operable to create new web pages with new content dynamically, which in turn provides new web real estate for placement of ads, and also where the persons either participating in the creation of content or consuming the content (for example by playing interactive video debates created by operation of the present invention) are likely in certain cases by virtue of this engagement to have an interest in a particular topic. This information may enable content sponsors to derive from this interest, related interest in a number of different topics, products, or services, thereby providing new opportunities for targeted advertising. It should be understood that based on various aspects of Internet advertising, the The system of the present invention may also include an administration module (26) that is used to manage access of specific users to specific functions of the system. The administration module (26) manages for example assignment of administrative access to content providers and/or advertisement agencies acting on behalf of content providers or companies interested in sponsoring content, to various functions of the platform.

The messaging and social media engine (20) or social media utility aspect of the present invention is best understood as a computer program or series of computer programs that provide the means for any manner of electronic communications between users of the system including but not limited to discussion threads, message boards, instant messaging, posts, blogs and so on. The social media utility contemplates the use of any existing and any to be deployed form of social media. The social media utility also enables the linking of the system of the invention to third party social media utilities such as FACEBOOK™ and others. In this way the social media utility acts as an interface between the system and third party systems so as to enable the extraction of meta data from the social interactions occurring in relation to the third party system to the extent that these are between users of the present system. This way for example interactions between a user and another user, or with content, captured by the audience engagement platform, may be published to social networking sites, resulting for example in a social media feed indicating for example that a user participated in a video debate on a particular topic. Users are interested in obtaining access to content for their websites, and in turn publication of content may result in further interactions with the content, or content associated with that content.

The use of a web server, or client-side software program, and processing server may provide a means for distributed computing benefits, for example hosted application service provider (ASP) processing models or software-as-a-service (SaaS) application delivery models.

The present invention may also be operable over a wireless infrastructure. Present wireless devices are often provided with web browsing capabilities, whether through WAP or traditional means. The user interface of the present invention may be provided to the wireless devices, with processing occurring on the server side of the communication channel or any server associated with such a network.

Workflow

Figure 2A:
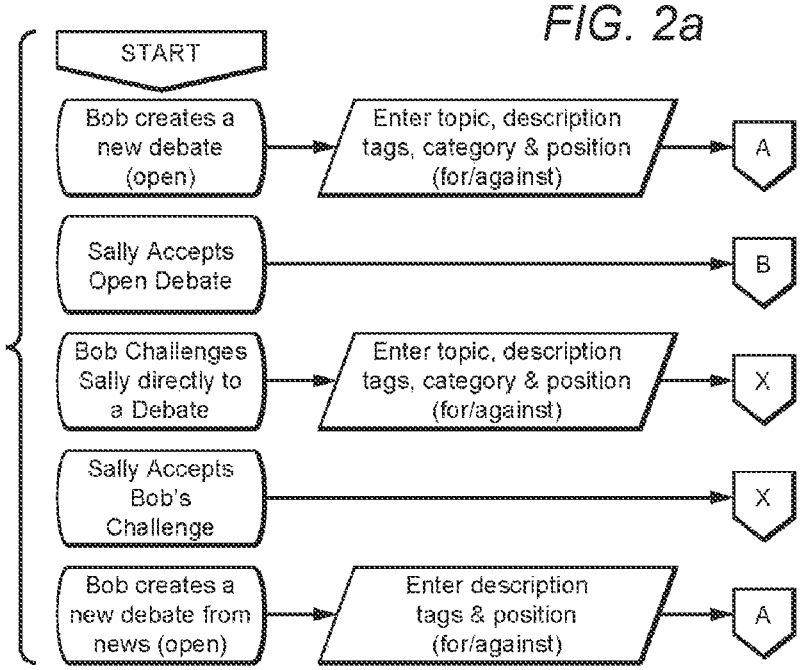
FIGS. 2a, 2b, 2c, 2d, and 2e illustrate a series of block diagrams depicting various aspects of the debate workflow of the present invention.
Figure 2B:
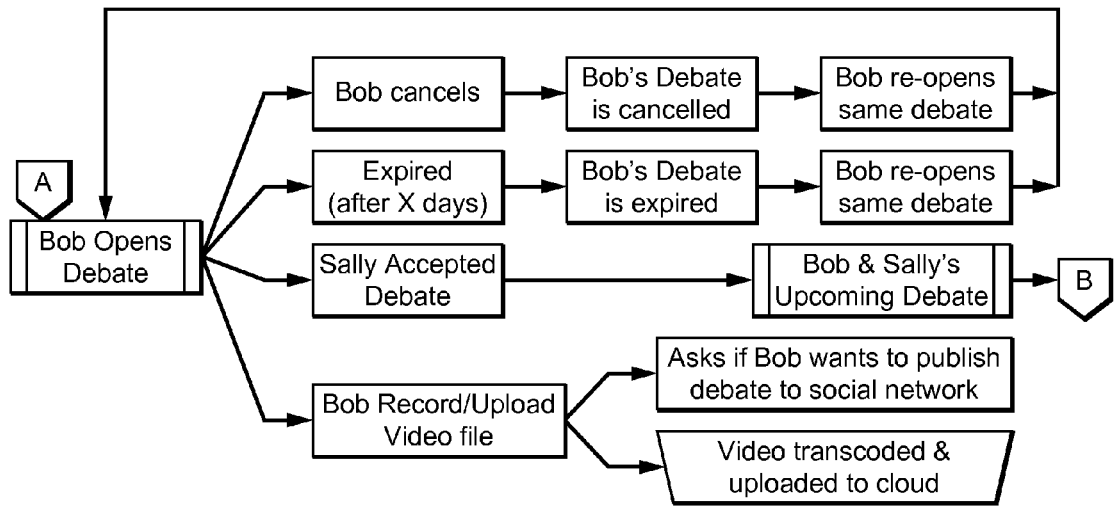
Figure 2E:
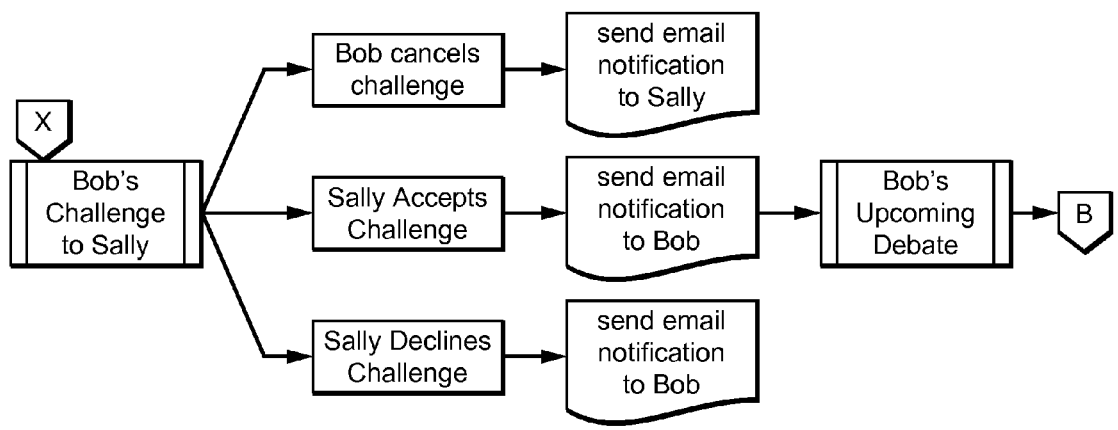
Figures 1, 2C:
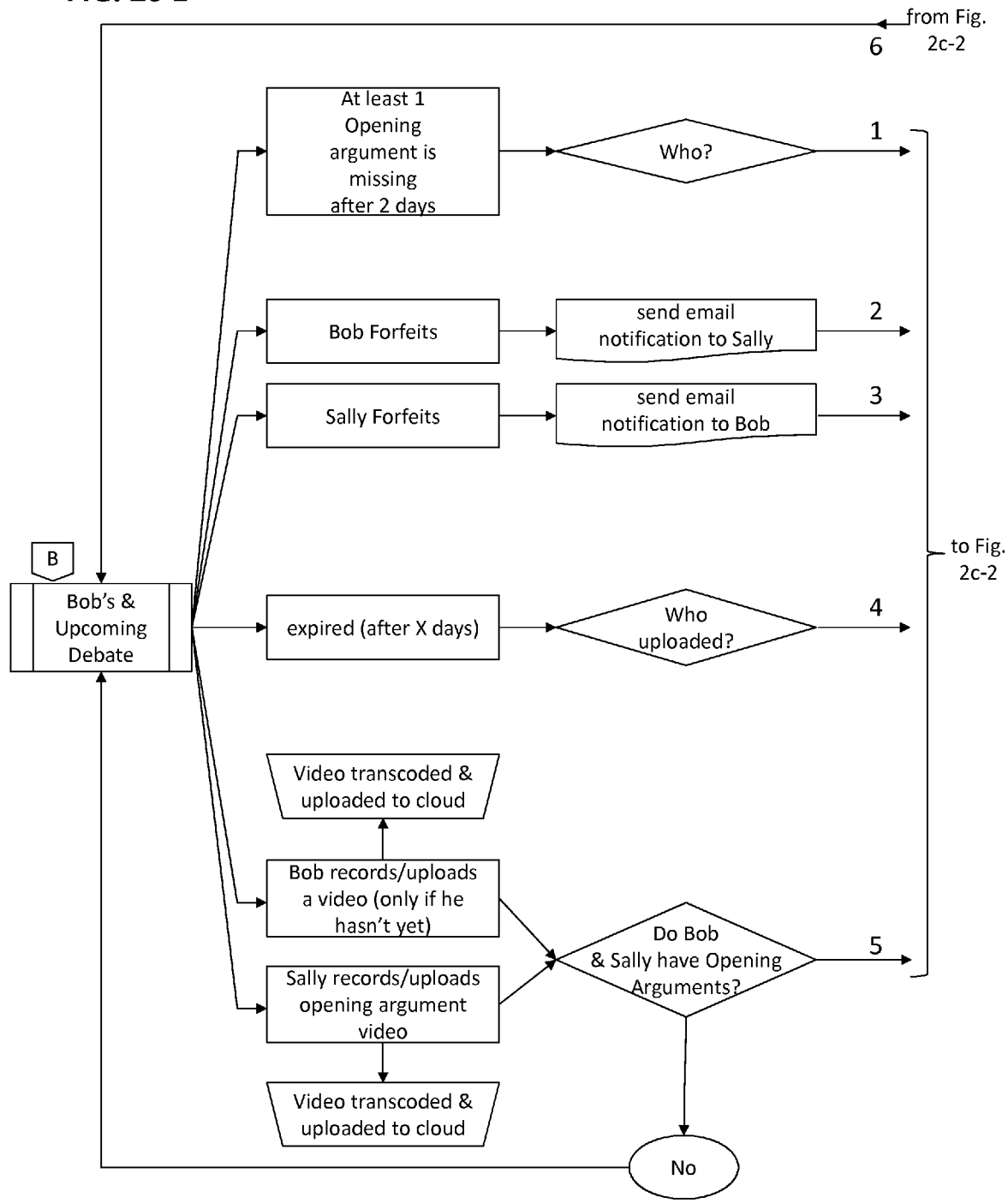
Figures 2, 2C:
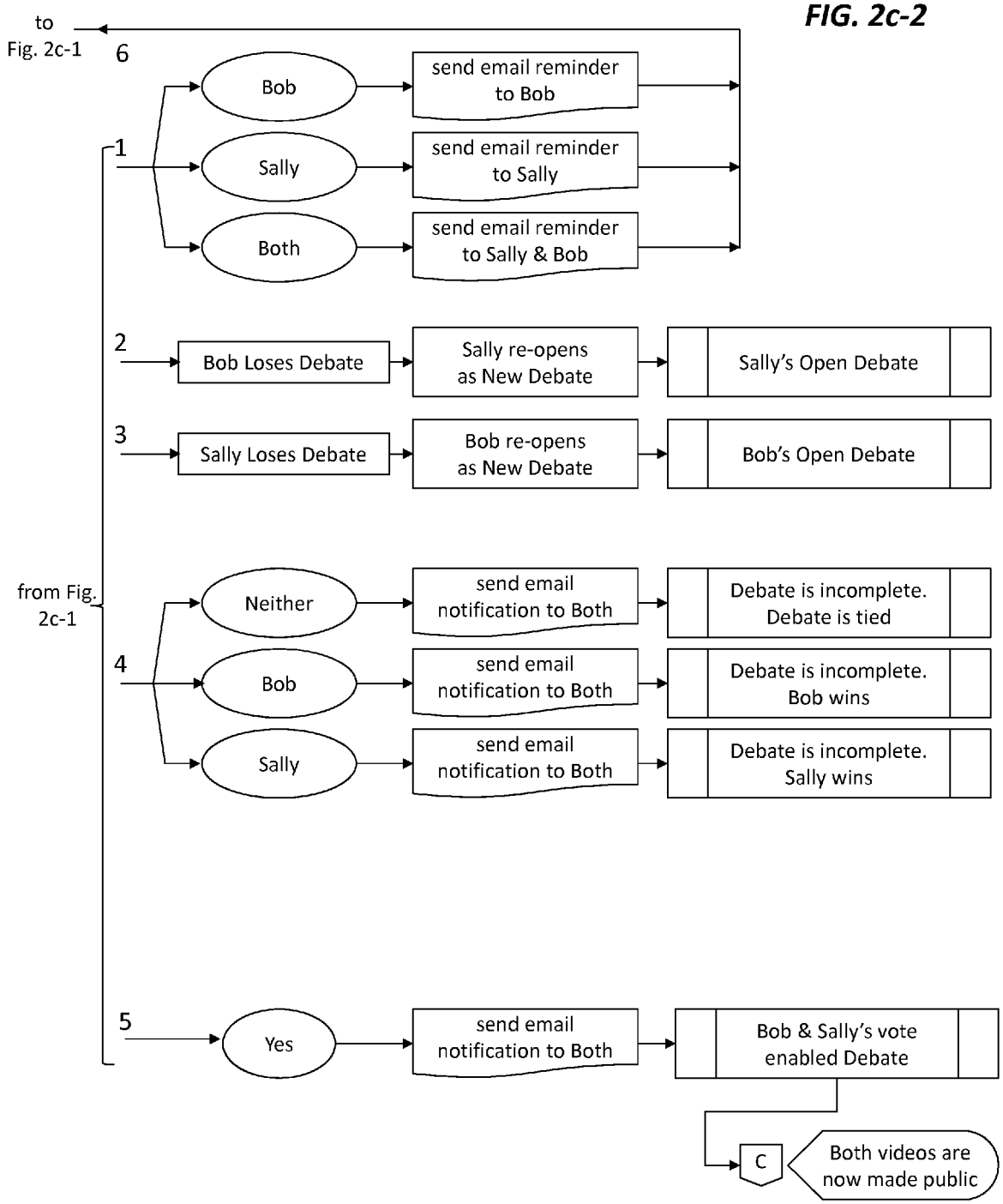
Figure 2D:
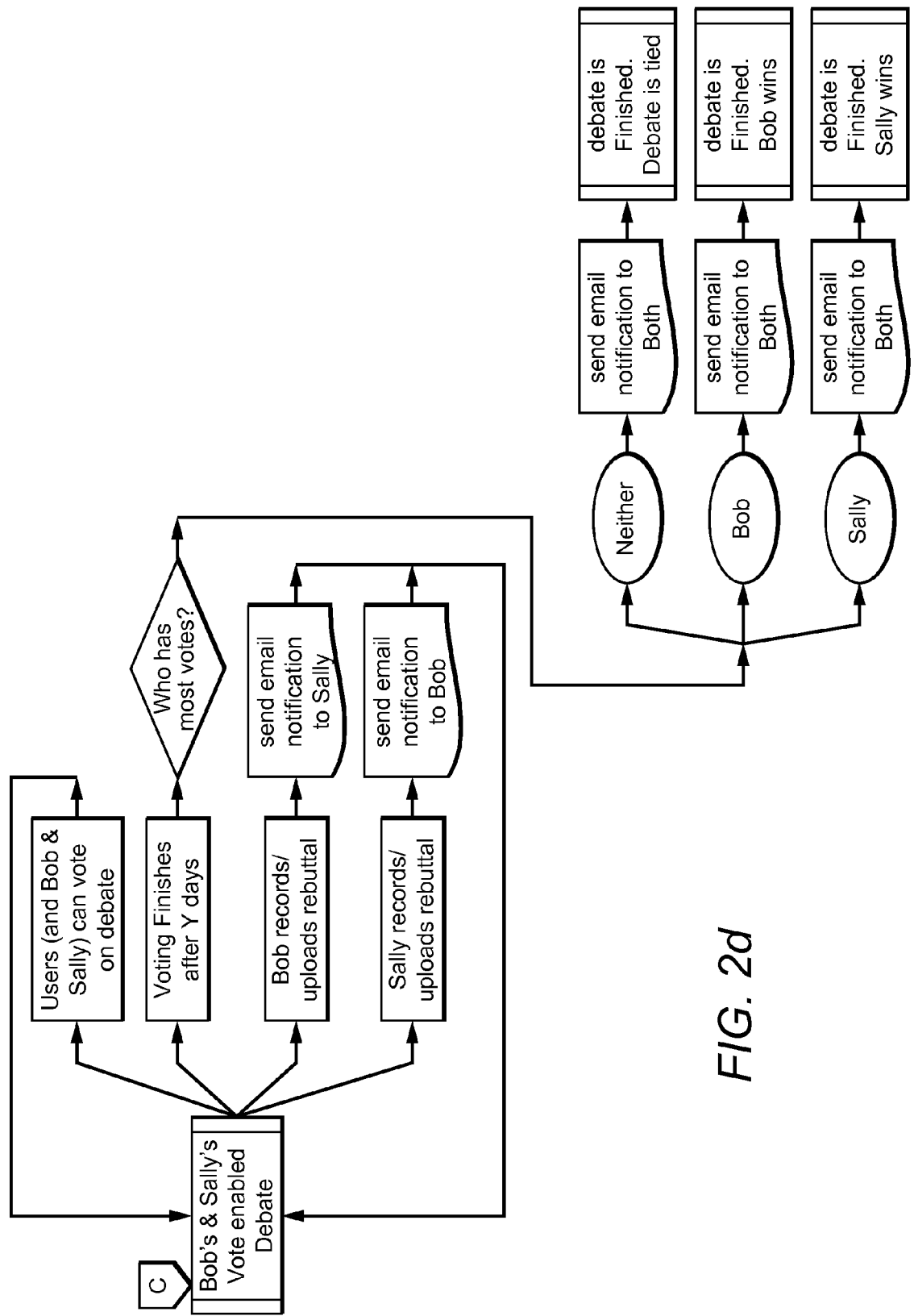

Referring next to FIG. 2, FIG. 2 shows a series of work flow diagrams depicting the debate content workflow, as enabled by the content engine of the present invention. In this embodiment, two or more users are prompted to provide specific information, such as a topic description for debate, and then comment on the information. The creation of such content depends on the system guiding the two or more users through the steps involved in a way that they are cumulatively likely to complete the steps required. All the debates that are created are capable of being displayed in multiple locations.

Generally speaking the method of the present invention involves the steps of:

(i) a first user initiating a computer network implemented platform to configure a debate regarding a particular topic, the first user defining one or more debate attributes which are logged to the platform, the debate attributes including whether the debate is "open" to any user, or whether the debate is "closed" in that it I open only to one or more users defined by the first user;

(ii) the platform publishes the challenge; if the debate is "open" then the challenge is published via one or more publicly available web sites, and if the debate is "closed" the challenge is communicated to the one or more users with instructions for participating in the debate;

(iii) one or more user receiving the challenge accept the challenge and are logged by the platform as participants or a "second user";

(iv) instructions are communicated to each of the first user and the second user for participating in the debate;

(v) in response to the instructions, each of the first user and the second user record their argument, which is posted to the platform, such that the argument remains private to the user posting the argument until each argument is received, thereby ensuring that neither the first user or the second user has an unfair advantage.

(vi) once each argument is received, both arguments are published by the platform;

(vii) the first user and second user are invited to view the debate once it is published, and are invited to record a rebuttal at any time, and upon posting of a rebuttal, the rebuttal of the first user and/or second user are also published in connection with the debate.

There are a number of ways in which the creation of interactive video debate content may be initiated and conducted. However, the following disclosure explains a number of novel and unobvious workflows for creating the content, which are practiced as a computer-implemented method, and also embodied in the platform of the present invention to provide aspects of the system and computer program of the present invention. It should be understood that the present invention is not limited to use of these particular workflows.

Workflow Aspect #1

A first possible aspect of the workflow for creating interactive video debate content in accordance with the present invention is the creation of a "NEW DEBATE".

For example, (A) Bob (as an example) may create a new debate, after which one of four processes may take place.

1. Bob may cancel the debate, and re-open the same debate, or
2. after a X number of days, the opened debate may expire, and he may then proceed to re-open the same debate, or
3. Sally (as an example) may accept the debate, which processes a confirmation of Bob's and Sally's upcoming debate, or
4. Bob records and/or uploads a video file, from which he will then have an option to publish debate to a social network or the video is then transcoded and uploaded to server or cloud service.

Workflow Aspect #2

After confirmation of a new debate, the described workflow involves one or more processes for guiding Bob and Sally through the steps involved in conducting the debate through electronic communications, which are then assembled to form the interactive video debate content of the present invention.

There are a number of processes, or aspect of processes that contribute to an advantageous proportion of debates opened that are concluded, and also that ensure the fairness of the debate. A number of aspects such as possible outcomes, competition related processes and voting on who has "won" a debate are designed to encourage engagement through healthy competition, and also to generate interest in others based on competition between specific users. Use of the invention has shown that certain popular debating pairs can generate significant buzz around a topic, content item, web page or web site, and generate a significant following, and further engagement. This engagement can contribute to certain content achieving significant distribution across the Internet, which is what content providers and content sponsors and so on all seek.

Some further possible aspects of Workflow Aspect #2 are as follows:

5. After two days (as an example) if at least one open argument is missing from either Bob or Sally or both, then an email reminder will be sent to Bob or Sally or both providing notification; or
6. Bob forfeits, after which an email notification is sent to Sally and Bob loses the debate, and Sally then re-opens the debate as a New Debate, or
7. Sally forfeits, after which an email notification is sent to Bob, and Sally loses the debate, and Bob then re-opens the debate as a New Debate; or
8. after X amount of days, the debate may expire and an email notification will be sent to both Bob and Sally advising of the outcome, which depends upon who uploaded the video debate. If neither party uploaded, the debate is determined to be incomplete and is tied. If Bob uploaded, the debate is determined to be incomplete, and Bob wins. If Sally uploaded, the debate is determined to be incomplete, and Sally wins; or
9. Bob records/uploads a video (only if he hasn't already) and if Bob and Sally have opening arguments, an email notification is sent to both Bob and Sally for a vote enabled debate and both videos are now made public. If Bob and Sally do not have opening arguments, then the debate remains in the upcoming debate phase.
10. Sally records/uploads a video, which is transcoded and uploaded to the platform, and if Bob and Sally have opening arguments, an email notification is sent to both Bob and Sally for a vote enabled debate and both videos are now made public. If Bob and Sally do not have opening arguments, then the debate remains in the upcoming debate phase.

It should be understood, that in one aspect of the invention, the content engine (10) is operable to guide the creation of the video debate such that the video content is not uploaded so as to be available to either of the participants, until each of the participants has uploaded their own remarks. This ensures that no participant has an unfair advantage in having been able to react to the arguments of another participant. In one aspect of the invention, therefore the present invention enables the creation of video debate content based on a "blind debate" concept. Other debate formats may also be used.

Workflow Aspect #3

Once the debate is vote enabled, one of four processes may take place:

1. Users as well as Bob and Sally may vote on the debate; or
2. After Y number of days, voting is finished, and an email notification is sent to both parties advising of the outcome which depends upon who has the most votes. If neither does, the debate is finished, and determined to be tied. If Bob has the most votes, the debate is finished, and Bob wins. If Sally has the most votes, the debate is finished, and Sally wins; or
3. Bob may record/upload a rebuttal, and an email notification advising of rebuttal is sent to Sally. The debate remains in vote-enabled phase; or
4. Sally may record/upload a rebuttal, and an email notification advising of rebuttal is sent to Bob. The debate remains in vote-enabled phase.

If Bob decides to challenge Sally,

1. Bob may cancel the challenge thereafter, and an email notification advising of cancellation is sent to Sally; or
2. Sally accepts the challenge, and an email notification of advising of acceptance is sent to Bob, and processes the debate as Bob's upcoming debate; or
3. Sally declines the challenge, and an email notification is sent to Bob.

It should be understood, that in one aspect of the invention, the ability to commence a debate in a number of ways provides flexibility in terms of allowing users to initiate a debate "on demand" based on their reaction to or interest in specific content for instance, and also enables the integration of the debate functionality in other web content in a number of different ways. As explained above, the debate functionality may be initiated by a user from an article, by challenging someone (for example based on their comment regarding an article, or their comment in response to another comment), of enabling users to initiate debates on their own or on an "open" basis for example by simply introducing the topic on their own. The fact that the platform of the present invention is operable to guide the creation of the debate content, but from a number of different starting points allows users to drive the use of the debate functionality based on their preferences and reactions.

It should be noted that the content engine (10) supports the communication use of communication of audio/video from a mobile device. For example, audio/video content referred to above may be recorded by a user using a mobile device, which in turn may be sent to the server (12) for assembly into the video debate content described.

In another aspect of the present invention, the server (12) is operable to provide moderation of video content. The server (12) includes or is linked to one or more utilities that are operable to enable the moderation of the video content. The utilities may enable users to flag video content that may not be desirable based on any number of criteria such as adult, violence, or racism. Also, the utilities may include analyzers that are operable to access audio and through speech to text conversion and analysis of text data against one or more libraries to identify video content that may require moderation.

In another aspect of the invention, the administrative module (26) enables users to customize a number of the steps involved in the workflows involved above, such as defining the time between steps, adding specific requirements around participation in creation of content (such as signing into a platform to enable the customization of offers etc.). The administrative module (26) enables customers of the operator of the platform, such as publishers, to define a range of different preferences, including as further described below.

It should be understood that via the social media engine (20), which may be a third party social media engine linked to the platform of the present invention, video debate content created via the platform may be shared for example using FACEBOOK™, likely with the consent of one or more of the participants' consent.

Figure 3:
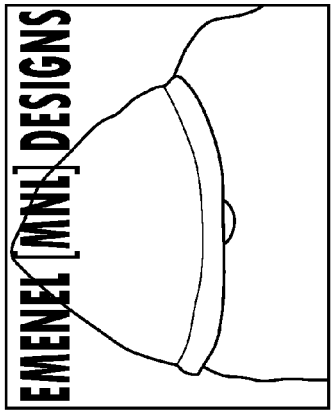
FIG. 3 is a screen shot of an embodiment of a user interface for displaying the system of the present invention.
Figure 4:
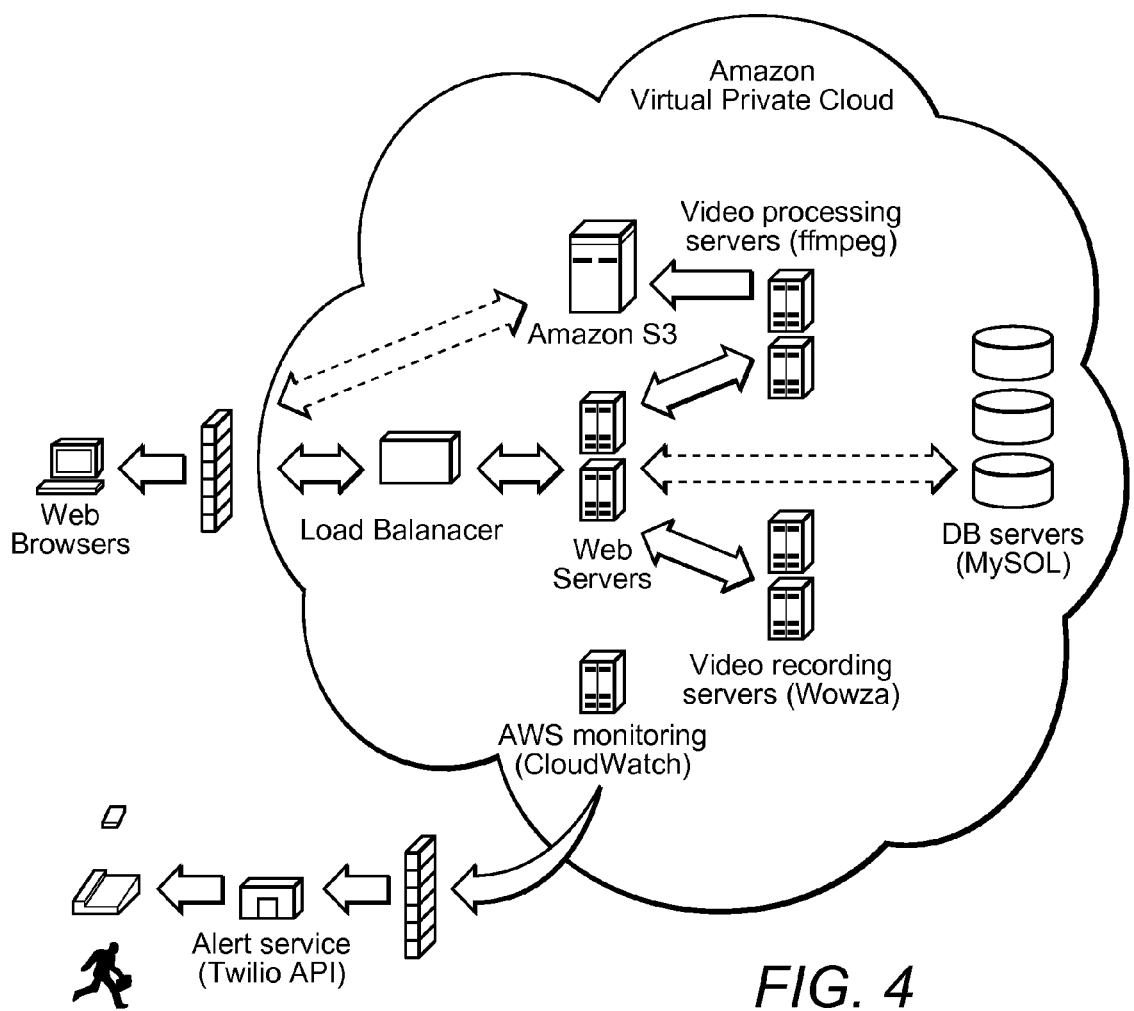
FIG. 4 is a further system diagram illustrating a possible implementation of the platform of the present invention.

FIG. 3 illustrates a representative web interface incorporating commenting and also video debate content based on the present invention, in one particular representation of the implementation of the invention.

Further Details of Implementation

In one aspect of the invention, the audience engagement platform is deployed as a SaaS application, and made available as a service to customers of the operator of the platform, for example based on a subscription service. The platform may be configured to integrate with customer web sites or web pages, for example using a suitable Application Programming Interface ("API") such as a JAVASCRIPT API.

It should be understood that the audience engagement platform of the present invention is configured to enable: (1) commenting by posting text, video and audio messages on web pages, including for example the web pages of a publisher, (2) rating and ranking by users, including of web pages, content items, information etc., (3) sharing content using social media, (4) viewing user profiles, (5) embedding by publishers of publishers' pages of social engagement page . elements, which may be implemented as widgets, (6) owners of web pages, such as publishers, to display various items including comments and user statistics, or trending content.

The present invention contemplates that the audience engagement platform includes an administration layer that enables authorized users (for example publishers who have subscribed to analytics services from the platform) to access one or more administrative tools or functions that are similar to those provided generally in WMS systems for example, but in this case utilize a number of unique aspects of the present invention to provide innovative functions that were not available to publishers before. For example the administrative layer, which may be provided by administration module (26), may enable authorized users to access:

(1) powerful analytics that includes website performance and content effectiveness (such as effectiveness of a particular article based on engagement), as measured by the platform;
(2) tools for authorized users such as moderators for the publishers that enable content to be viewed (including by linking content to rankings based on user engagement as measured by operation of the platform) and deleted or promoted. Additionally, content items may be flagged on a variety of bases;
(3) Tools to generate and access user specific statistics (based on the user engagement information that is driven by the unique content and unique interactions enabled by the present invention);
(4) Tools that enable moderators to ban or restrict permissions associated with particular users, while weighing the contributions of users to engagement relevant to the website owner or publisher. It is important to note that content moderation can be time consuming if done manually, and if done on an automated basis can decrease engagement through the website. Some users' views may be offensive, but then again that user may be a key drives in user engagement to a website. Also, the culture of every organization is different as to how it approaches such issues as balancing free speech with limiting offensive language. The platform of the present invention enables moderators to consider the implications of certain user's activities on engagement levels to balance these considerations in a more informed manner.

System Implementation

It should be understood that the computer program may be run on a cloud network using configurations. For example, the computer program may be deployed using a cloud hosting facility.

Implementation by a customer of the platform (such as a publisher) may require only, in one implementation, the inclusion of a JAVASCRIPT code provided by the platform operator into each web page where the customer wishes to provide user engagement fed by the audience engagement platform of the present invention. In other words, the present invention may be provided as a user engagement service that supplements for example the user engagement capabilities of the web pages of a customer. The customer may use a third party WMS, or their own WMS, but accesses the unique interactive content through the operator of the platform, as well as analytics linked to that interactive content. The analytics, however, may be consumed for example through a third party platform (supplementing other analytics) or one or more custom dashboards configured by or for the customer.

In another aspect, a customer (or their web master for example) may include a widget into selected pages that enable the platform of the present invention to feed to the web pages including the widget selected feeds from the platform of the invention such as top users (based on engagement), most commented articles or trending articles (including based on the unique and innovative user engagement metrics that are possible by operation of the platform of the invention).

The technology stack for enabling the cloud based service of the present invention, in one implementation thereof, may be implemented using various suitable components, preferably implemented as a multi-tiered scalable architecture that enable multiple authentication and robust segregation of information.

Figure 5:
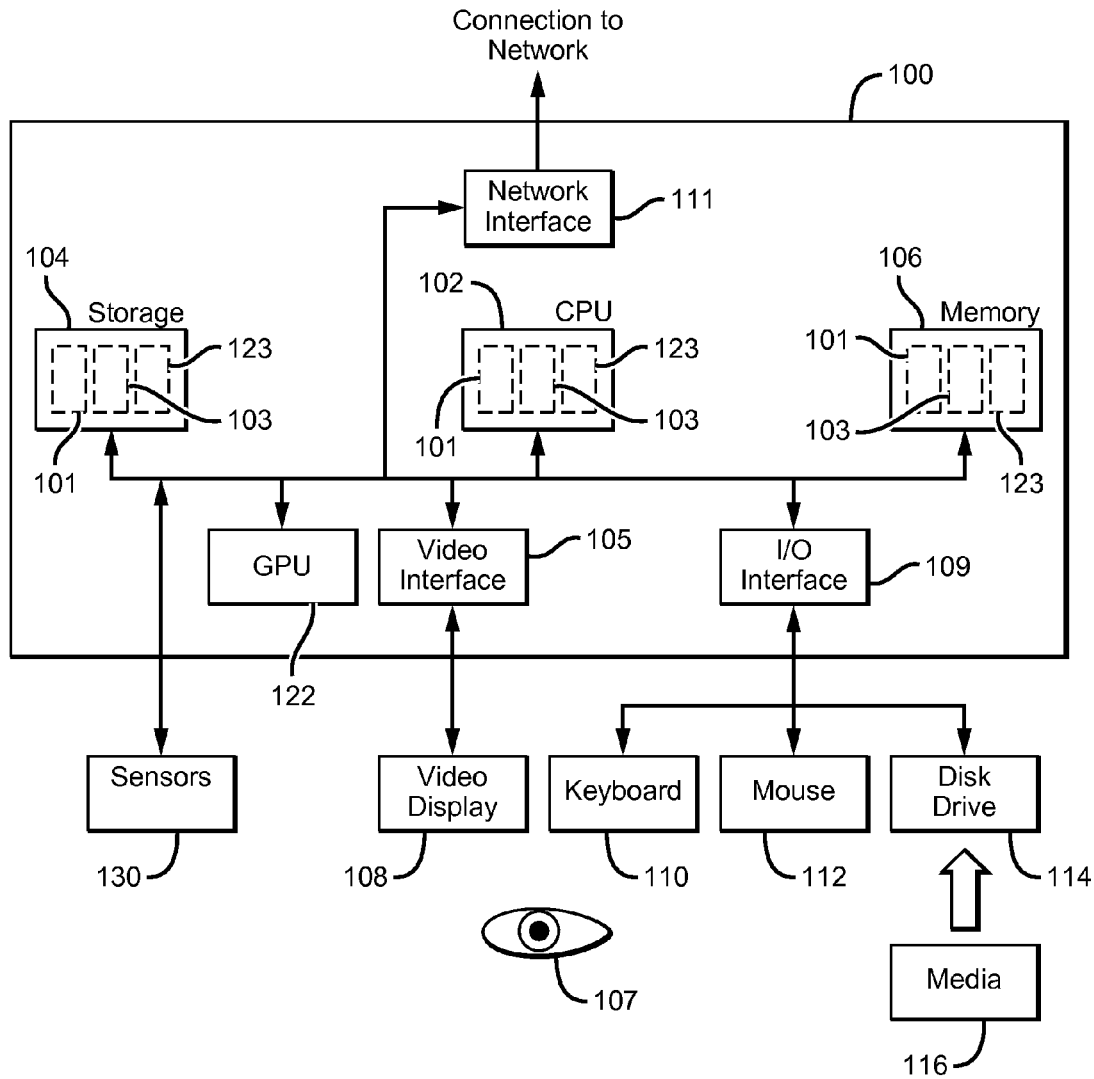
FIG. 5 is a diagram illustrating a general computer system implementation of the present invention.

The present system and method may be practiced in various embodiments. A suitably configured computer device, and associated communications networks, devices, software and firmware may provide a platform for enabling one or more embodiments as described above. By way of example, FIG. 5 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 110, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 130 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

It will be appreciated by those skilled in the art that other variations of the embodiments described herein may also be practiced without departing from the scope of the invention. Other modifications are therefore possible.

The invention claimed is:

1. A computer implemented system, comprising:
   at least one server computer having a processor and a non-transitory computer-readable memory storing a content engine and an analytics engine, wherein:
   the content engine, when executed by the processor, causes the processor to;
   (a) enable a first user to initiate a challenge for a debate to a second user;
   (b) enable the second user to accept the challenge from the second user;
   (c) track contributions of the the-first user and the second user to interactive digital content of the debate; and
   (d) publish the interactive digital content to at least one web page; wherein the interactive digital content comprises split screen video debate content that incorporates video content from the first user and the second user to form and integrated interactive video debate, and
   the analytics engine, when executed by the processor, causes the processor to:
   track interaction with a content item and rank the interactions based on a user's degree of engagement with the content item;
   identify that the first user is likely interested in debating the content item with the second user;
   identify a group of users interested in the content item;
   send the group of users a message to encourage the first user and the second user to debate, the message comprising a clickable response; and
   in response to receiving the clickable response from interested users within the group of users, sending a message to the first user and the second user indicating an interest in debate between the first user and the second user.

2. The system of claim 1, wherein the content engine is configured to prevent the interactive digital content from being published until each of the first user and second user has uploaded their own contributions.

3. The system of claim 1, wherein the content engine is further configured to enable each of the first user and the second user to create a rebuttal after the interactive digital content has been published.

4. The system of claim 1, further comprising a reporting utility that is configured to generate a trend report as a function of the ranked interactions.

5. The system of claim 1, wherein the analytics engine causing the processor to identify that the first user is likely interested in debating the content item with the second user comprises causing the processor to:
   apply one or more predetermined user engagement threshold to the ranked interactions; and
   detect when the first user is likely to challenge the second user to the debate based on the applied one or more predetermined user engagement thresholds.

6. The system of claim 1, wherein the content item comprises a dynamically generated document summary.

7. The system of claim 1, wherein the analytics engine is configured to track and rank the interactions based on predetermined engagement related milestones.

8. The system of claim 1, wherein the analytics engine is configured to associate a tracked user's participation in a video debate with a higher ranking than a selection of a web object that records the tracked user's position regarding the content item.

9. The system of claim 1, wherein the content engine is further configured to enable a group of users to post comments regarding the posted interactive digital content.

10. The system of claim 1, wherein the content engine is configured to enable a group of users to vote on whether the first user or the second user won the debate.

11. The system of claim 10, wherein the content engine is configured to enable at least one of the first user and the second user to upload a rebuttal to the interactive digital content of the debate while voting is enabled.

12. The system of claim 1, wherein the content engine is configured to send a reminder to the second user when the second user has failed to provide a contribution to the interactive digital content of the debate.

* * * * *